June 16, 1925.
J. S. REYNOLDS
1,542,173
BRAKE SYSTEM FOR VEHICLE TRAINS
Filed June 17, 1922
3 Sheets-Sheet 1
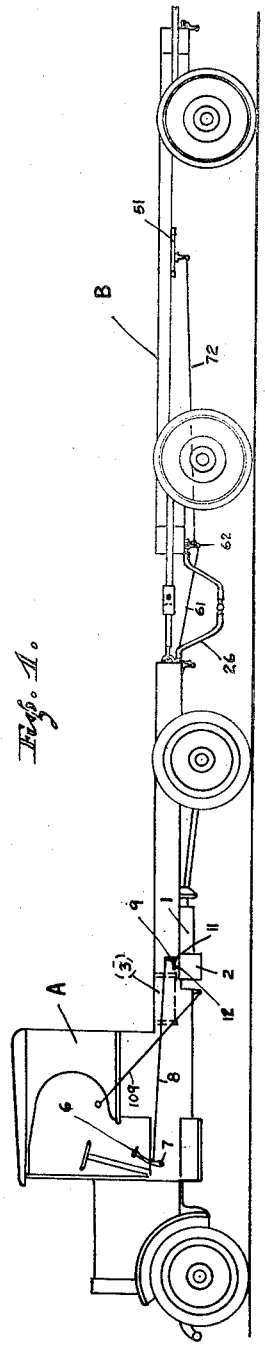
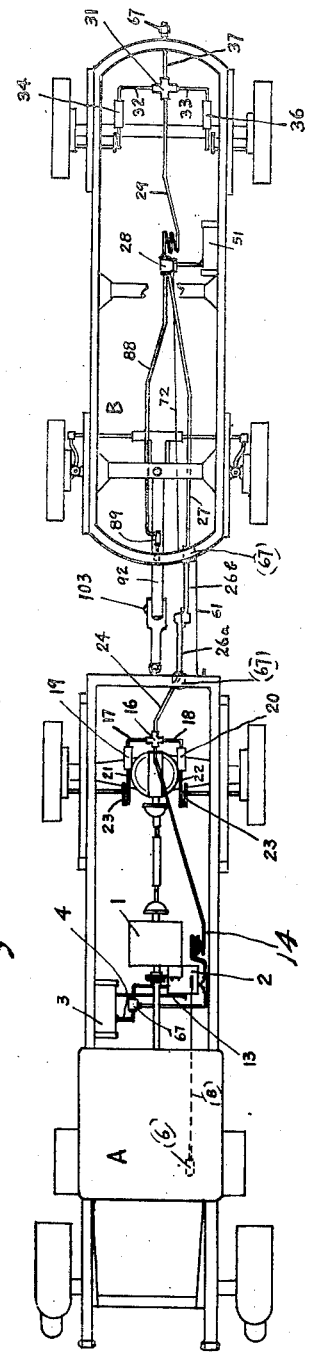
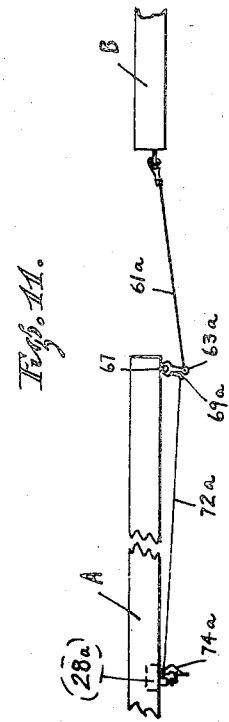
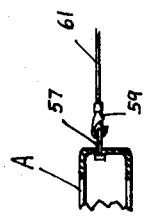
INVENTOR.
JOY S. REYNOLDS
BY
Bradley L. Benson
ATTORNEY.

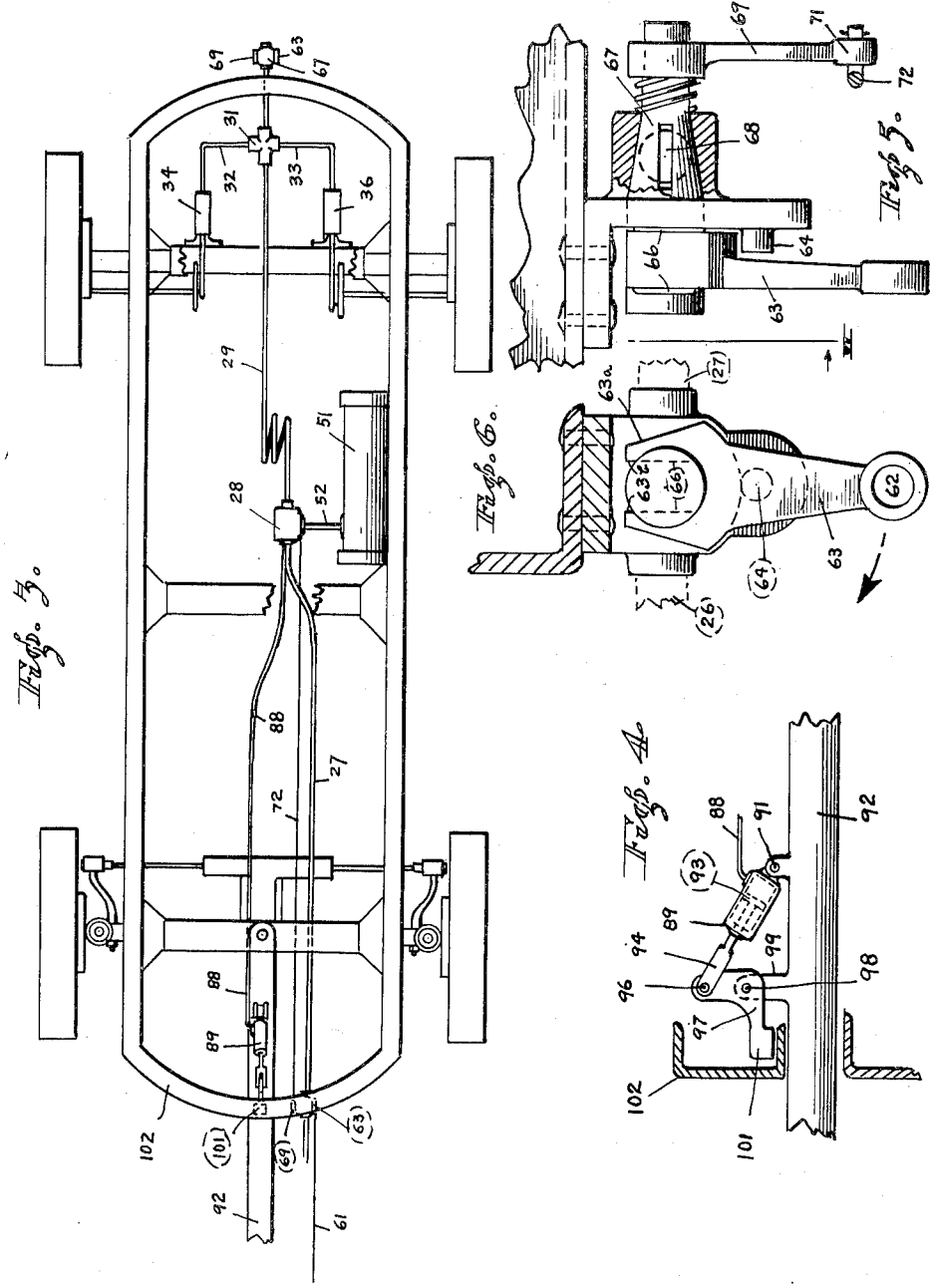

June 16, 1925.
J. S. REYNOLDS
1,542,173
BRAKE SYSTEM FOR VEHICLE TRAINS
Filed June 17, 1922  3 Sheets-Sheet 3
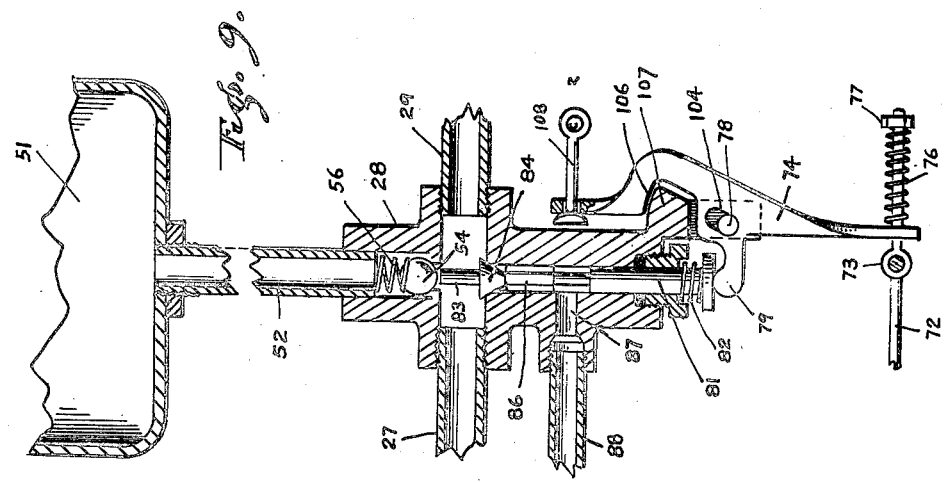
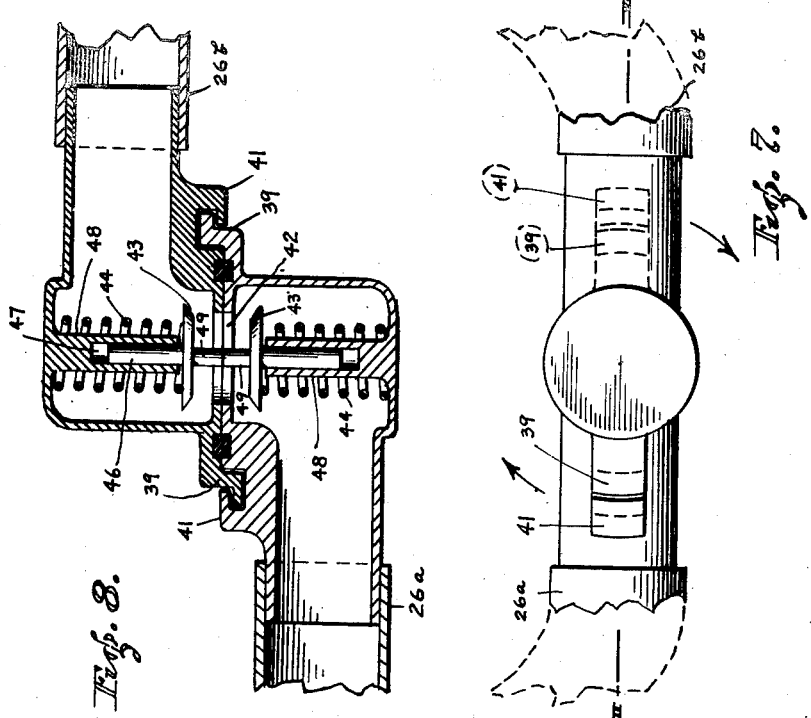
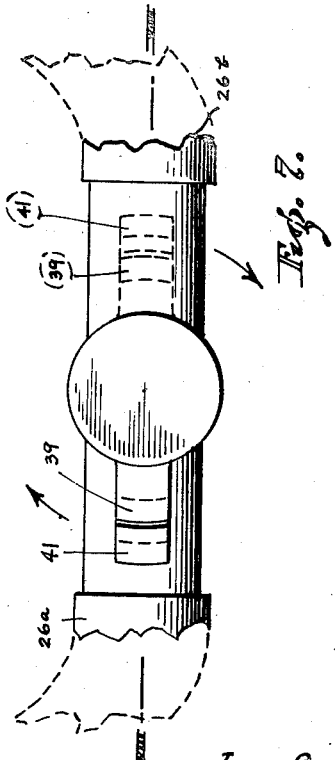
INVENTOR.
JOY S. REYNOLDS
BY
Bradley L. Benson
ATTORNEY.

Patented June 16, 1925.

1,542,173

UNITED STATES PATENT OFFICE.

JOY S. REYNOLDS, OF SAN FRANCISCO, CALIFORNIA, ASSIGNOR, BY DIRECT AND MESNE ASSIGNMENTS, TO REYNOLDS BRAKE CORPORATION, OF DETROIT, MICHIGAN, A CORPORATION OF MICHIGAN.

BRAKE SYSTEM FOR VEHICLE TRAINS.

Application filed June 17, 1922. Serial No. 569,132.

*To all whom it may concern:*

Be it known that I, JOY S. REYNOLDS, a citizen of the United States of America, residing at 1234 Jackson Street, San Francisco, in the county of San Francisco and State of California, have invented certain new and useful Improvements in Brake Systems for Vehicle Trains, of which the following is a specification.

The present invention is an improved braking system for automotive trains.

The objects of the invention include:

(1) The provision of a braking system for vehicle trains in which means are provided whereby the application of brakes to the tractor or lead vehicle will also cause an application of brakes to each trailed vehicle and in the same degree as that applied to the tractor.

(2) The provision of a brake system for vehicle trains wherein are provided means, operative upon disconnection or dismemberment of the train, for automatically applying brakes to the disconnected trailing members without applying said brakes on the lead members or vehicles of the moving train; and means whereby both separated parts of a vehicle train may receive an application of brakes automatically upon accidental disconnection, if desired, and thereby warn the driver of a disconnection either of said operations being predetermined by the manner in which the vehicles are connected when the train is made up.

(3) The provision of a braking system for automotive vehicle trains wherein are provided means for causing an application of brakes throughout the train to accumulate and maintain sufficient pressure on each trailed vehicle to cause an automatic application of brakes on said vehicle, should the same become necessary because of disconnection of the train.

(4) The provision in a vehicle train of means, made operative by the disconnection of the units of the train, whereby the steering parts of the disconnected units will be engaged and maintained in the positions they assumed at the time of said disconnection, and whereby the vehicles so disconnected will be brought to a stop by a brake application.

In this specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatever form it may be embodied.

In the accompanying three sheets of drawings:

Fig. 1 is a diagrammatic side elevation of a plurality of train vehicles showing my system applied thereto.

Fig. 2 is a top plan view of Fig. 1.

Fig. 3 is a top plan view of a trailer on an enlarged scale illustrating the couplings and connections of the units.

Fig. 4 is a fragmentary detail showing a means for securing the steering arm of a trailer in any position it may assume on disconnection of the trailer.

Fig. 5 is a side elevation partly in section of a plug valve showing an automatically detachable lever control.

Fig. 6 is a section of Fig. 5 taken on the line VI—VI looking in the direction of the arrow.

Fig. 7 is a side elevation of a coupling for a fluid line.

Fig. 8 is a section of Fig. 7 taken on the line VIII—VIII.

Fig. 9 is a central section of a valve and pull rod controls.

Fig. 10 is an enlarged detail of a snap connection.

Fig. 11 is an enlarged detail showing another method of connection.

Referring to the drawings; Figs. 1 and 2, the letter A indicates in its entirety a motor truck or tractor, and B a trailer connected in train formation and in the following description the parts are so arranged as to make them adaptable to trains of greater length and composed of more trailers.

On the tractor, A at 1, I show the transmission housing to which is attached a reservoir 2 containing a pressure accumulating system, and containing a quantity of liquid, a pump driven by the transmission of the tractor, and an automatically operated cutout adapted to automatically cut in and out the pump operation at a predetermined pressure in a pressure storage tank 3.

All the parts so far mentioned are clearly shown and claimed in my pending application Serial 491,947, filed August 13, 1921.

Pressure, accumulated by the pump in reservoir 2, is transmitted to pressure tank 3 through a pipe 4.

To effect a braking operation on the tractor by the usual foot pedal means I provide the following apparatus.

At 6, Fig. 1, I show a foot pedal pivoted at 7. A pull rod 8 connects the foot pedal 6 with one end of an elbow lever 9, pivoted at 11. The arm of elbow lever 9, remote from pull rod 8, depresses a valve stem 12.

The stem 12 is part of an automatic control valve adapted to admit liquid under pressure to a brake pipe line (to be later described) and upon reverse movement of the controls, provide for the release of liquid from said line returning to the source.

While any valve which will accomplish these results will serve here, I prefer to use the control valve shown in my Letters Patent No. 1,474,164.

When valve stem 12 is depressed liquid under pressure leaves tank 3 through a pipe 13, through the control valve and enters a pipe 14 leading to a four-way connection 16 at the rear of the tractor.

Connected with said four-way connection are pipes 17 and 18, which serve cylinders 19 and 20, respectively, and thus move pistons in said cylinders to actuate rods 21 and 22, which rods move the brake levers 23 in the usual manner.

To that leg of the four-way connection extending rearwardly is connected a pipe 24, which supplies the brakes of the trailed units (in this case one).

The pipe 24 connects, through a flexible conduit 26, with a pipe 27 leading to a valve casting 28, from the rear side of which extends a pipe 29 leading to a four-way connection 31.

The function of this connection is the same as that of the connection 16.

Pipes 32 and 33 serve cylinders 34 and 36 to apply brakes on the trailer wheels and a pipe 37 continues the system rearwardly by repeating the installation.

The rear end of the brake pipe line is provided with a plug cock 67 to close the line. One of these plug cocks (shown in detail in Figs. 5 and 6) is provided on each end of each trailer and one on the rear end of the tractor for purposes later described.

It will be seen that, by the means so far described, the driver of the tractor A can apply brakes simultaneously on both tractor and trailer.

I will now describe means whereby, should the train be accidentally disconnected or broken in two, the flexible conduit 26 will be severed and the separated ends thereof closed against release of liquid, and thus leave the brake pipe lines on both disconnected sections of the train in operative condition.

The flexible conduit 26 is composed of two parts 26$^a$ and 26$^b$, best shown in Figs. 7 and 8.

The adjacent ends of the parts 26$^a$ and 26$^b$ are provided with complementary cam members 39 and 41 adapted to draw the parts together, when rotated to the position shown in Figs. 7 and 8, and to release said parts automatically when the conduit as a whole is straightened out as would be the case should the connection between the tractor and trailer give way.

In the end of each of members 26$^a$ and 26$^b$ is an orifice 42, which is closed, before the parts are connected, by a valve 43 urged to seated position by a coiled spring 44. Each of valves 43 is provided with a stem 46 slidable in a bore 47 in a boss 48 to keep the valve in alinement with its seat, and is also provided with a stud 49 extending through the orifice 42.

It will be seen that both members of the flexible conduit 26 are closed by the spring pressed valves 43 when the parts are separated, and that, as they are joined by the cam members 39 and 41, the studs 49 on the opposed valves abut each other and hold both valves open when the coupling is completed.

It will also be seen that the boss 48 will contact with the back of the valve 43 and thus prevent either valve from yielding to a position which would allow the other to seat.

It is obvious that this automatic closing of the flexible conduit at the point of separation leaves the liquid brake operating means on the tractor in operative condition after the train is broken in two.

I will now describe means, operative upon disconnection of the train, for automatically locking the steering members of the trailers and applying brakes to said trailers.

At 51, Figs. 2 and 3, I show an auxiliary pressure tank secured to the body of the trailer B. This tank is connected with the brake pipe line (through the valve casting 28) by a pipe 52. This valve casting 28 is shown in detail in Fig. 9.

When the train is made up the tank 51 is partially filled with liquid under a cushion of air or the like. However, should the pressure subside in tank 51, it may be replenished from the brake pipe line, by making a full brake application throughout the train. When such application is made, pressure in pipe 27, Fig. 9, unseats a valve 54, allowing passage of liquid from pipe 27, through pipe 52, to the tank 51.

The check valve 54 is normally kept in seated position by a spring 56.

In order to utilize the reserve pressure in auxiliary tank 51 to lock the steering members of the trailers (in the position they assumed at the moment of disconnection) and apply brakes I provide the following means:

In Fig. 10, at 57, I show an eyebolt secured to the rear end of tractor A.

A snap 59 is secured to one end of a cable 61, the opposite end of which is connected to an eye 62 in one end of a lever 63, Fig. 6.

Upon disconnection of the train, the cable 61 being attached to the forward unit exerts a pull on lever 63, which rotates the said lever to a position in which the side 63ª of said lever will clear a pin 64, at which time the lever will disengage and be dragged by the tractor.

The lever 63 is, in effect, a wrench, the jaws, 63ᵇ, of which engage a flattened portion 66 of the plug valve 67. The rotation and disengagement of lever 63 just described rotates the plug valve 67 to a position in which a passage 68 in said valve is closed. This closes communication between the flexible conduit 26 and pipe 27. Also secured to plug valve 67 is a lever 69, which is rotated as the valve is closed.

Secured to an eye 71 in lever 69 is one end of a cable 72, the opposite end of which is secured to an eyebolt 73, Fig. 9, extending through one end of a lever 74. This last named connection is made yieldable by a spring 76 surrounding eyebolt 73 and bearing at one end against a nut 77 and at the other against the lever 74.

It will be seen that the disconnection of the train actuates lever 74 which is pivoted on a pin 78. As the lever 74 rocks on its pivot 78 an arm 79 on said lever moves a valve stem 81 normally pressed by a spring 82.

On valve stem 81 at the end remote from the arm 79, I provide a pin 83 which (when actuated by arm 79) unseats valve 54, releasing pressure from the auxiliary tank 51, admitting said pressure to the brake line throughout the disconnected section of the train, at which time brakes are applied automatically.

The same movement of valve stem 81 which unseats valve 54, also, and slightly in advance thereof unseats a valve 84, allowing liquid from tank 51 to flow past a fluted portion 86 of valve stem 81, through a passage 87, into a flexible tube 88. The end of tube 88 remote from valve 53 supplies a cylinder 89, Fig. 4, pivoted at 91 to the drawbar 92. A piston 93 is actuated by the incoming liquid and the piston rod 94 is pivoted at 96 to one end of an elbow lever 97 pivoted at 98, on a lug 99 on the draw bar 92.

The end 101 of the elbow lever remote from piston rod 94, when the lever 97 is actuated, clamps the curved frame member 102 of the trailer body to the draw bar 92.

This securely holds the draw bar which in turn holds the steering members in the exact position they were in at the time of disconnection.

Operation: Assuming that the parts so far described are installed on a train consisting of trailers B pulled by tractor A; in making up the train, the coupling of each additional unit or trailer extends the main artery or brake pipe line to the rear end of said unit, (by reason of the flexible coupling structure shown in Figs. 7 and 8) assuming that the plug valves 67 are open.

A general brake application (and release) may be made throughout the train by applying foot pedal 6. According to a predetermined make up of the train, a braking operation may be automatically completed at the moment of disconnection on either tractor section or trailer section of the train or, if desired, on both sections.

Should the driver elect to make the automatic brake application only on the rear disconnected section, leaving the forward section under control of the driver, the train is made up as shown in Figs. 1 and 2.

When the train separates as, for instance, by shearing of a coupling pin 103, Fig. 2, the cable 61, secured to the tractor, becomes taut as the tractor pulls away from the train. This pull rotates lever 63, closing plug valve 67, at which time lever 63 automatically disconnects from said valve. The same pull which closes the plug valve 67, also (through lever 69 and cable 72) actuates lever 74, raising valve stem 81, opening valves 54 and 84, admitting pressure from auxiliary tank 51 to brake line 29 and thereby setting brakes and also admitting said pressure to pipe 88 supplying cylinder 89 which locks the steering members. This operation has the effect of substituting automatically the auxiliary tank 51 for the disconnected high pressure tank 3. The tank 51 now serves to apply brakes to all trailers to the rear of the vehicle on which it is carried.

As, hereinbefore mentioned, the coupling members of flexible conduit 26, in parting as described, close both broken ends of the brake pipe line, and conserve the fluid in each unit, leaving the front section under control of the driver.

In order to lock the parts to keep the brakes set and the steering members locked until manually released, I provide the following means:

The lever 74, Fig. 9, is slotted at 104 to permit said lever to fall with respect to its pivot 78 when said lever is rotated to a position where a shoulder 106 clears a lug 107, which prevents the return of said lever.

Should the driver elect to make an automatic brake application on both sections upon disconnection, this may be done by the additional use of the parts already described. In this case, in addition to the assembly shown in Figs. 1 and 2 the parts shown in Fig. 11 are added. A cable 61ª is fastened by a snap to trailer B. The opposite end of said cable is secured to a lever 63ª of a plug valve 67 on the rear of vehicle A.

To the lever 69ª on said valve is secured one end of a cable 72ª, the opposite end of which is secured to a lever 74ª on a valve 28ª on vehicle A.

By this means the parts function alike on each of the disconnected sections of the train.

In order to make lever 74, Fig. 9, responsive to a pull from either direction and make it applicable for either front or rear end connections, I provide an eyebolt 108 which serves in the same capacity as the eyebolt 73, but on the opposite side of pivot 78.

In order to provide means whereby the driver of the tractor may make an emergency brake application throughout the train, should the automatic control valve fail to operate, I provide a cable 109, Fig. 1, one end of which is attached to the eyebolt 73, Fig. 9, and the opposite end placed conveniently to the driver.

A pull on this cable will effect a general brake application throughout the train.

I claim;

1. A braking system for vehicle trains consisting of a tractor member and trailer members, comprising means for accumulating and storing fluid under pressure on said tractor, means operated by said pressure for applying brakes on said tractor, a conduit connected with said source of pressure and extending throughout the train and adapted to serve brake elements on said tractor and said trailers, an auxiliary pressure tank positioned on each of said trailers and supplied by said conduit, and pressure operated means, responsive to a disconnection of said train, whereby the pressure in said auxiliary tanks will effect a locking of the steering gear of said trailers in the position that the said gear assumed at the time of said disconnection.

2. A braking system for vehicle trains composed of a tractor member and trailer members, comprising means operated by the propelling mechanism of said tractor for compressing fluid, a receptacle on said tractor for storing said fluid, an auxiliary storage receptacle on each trailer unit of the train, a conduit extending throughout the length of the train and connecting said auxiliary receptacles with said first named receptacle, means, connected with said conduit and operated by fluid pressure, for setting brakes on each of the vehicles of the train, and means, rendered operative by the severance of said train, for causing the pressure in said auxiliary receptacles to lock the steering gear controlling the trailer members to the rear of the point of said severance.

In testimony whereof I affix my signature.

JOY S. REYNOLDS.